United States Patent [19]

Borg et al.

[11] 3,723,359
[45] Mar. 27, 1973

[54] CERMET POWDERS

[75] Inventors: Richard J. Borg; David Y. F. Lai; Neil R. Riley; James R. Wolfe, all of Livermore, Calif.

[73] Assignee: California Metallurgical Industries, Inc., Livermore, Calif.

[22] Filed: June 8, 1970

[21] Appl. No.: 44,608

[52] U.S. Cl. ............... 252/513, 252/516, 252/520, 29/182.8
[51] Int. Cl. ........................ H01b 1/02, B22f 3/00
[58] Field of Search............. 252/516, 513, 504, 520; 29/182.5, 182.7, 182.8

[56] References Cited

UNITED STATES PATENTS 3,507,631   4/1970   Yates ................................. 29/182.5
3,533,781   10/1970   Tracey et al. ..................... 29/182.5

*Primary Examiner*—Douglas J. Drummond
*Attorney*—Kenyon and Kenyon, Reilly, Carr & Chapin

[57] ABSTRACT

A metallurgical method for making homogeneous powders characterized by ultra-fine particle size typically in the range .01 – .1 microns. First, dry blend starting materials containing a mixture of carbon and the metal oxides of two or more different metals, one metal having a predetermined carbide forming strength and the other metal having less than the predetermined carbide forming strength. The starting materials are then cold mixed with a liquid prepolymerized furfuryl alcohol resin binder containing a catalyst until a homogeneous mass is obtained. The mass is cold extruded into the shape of an electrode, cured to the desired hardness and then rapidly baked until electrically conductive. The electrode is then connected as the anode in a high intensity electric arc circuit enclosed in a non-oxidizing atmosphere. The arc process consumes the anode and a homogeneous powder is produced out of the characteristic tail flame. The powder comprises a mixture of finely divided particles of metal carbide and metal useful in manufacturing cemented carbide bodies.

6 Claims, No Drawings

3,723,359

CERMET POWDERS

BACKGROUND OF THE INVENTION

1. Field of the Invention

This invention relates to reducing ore or other starting materials containing unrefined metal values to powdered compositions having an inorganic base, such as metallic carbide and metal particles, and to the processes of preparing or making these compositions through chemical reactions brought about by the use of an electrical discharge in a high intensity arc. Due to the refractory nature of the constituents, these compositions are useful in manufacturing articles designed to withstand high temperatures, in particular machine cutting tools and other cemented carbide products.

The invention further relates to improvements in the intermediary processes of treating the inorganic raw materials with a liquid polymerizing binder and making them into electrically conductive bodies, as by sintering. These electrically conductive bodies have a high percentage of non-carbonaceous material. They are typically shaped as an electrode and are used, for example, as the consumable anodes in the aforesaid high intensity arc electrical circuit.

In their final sintered form machine cutting tools and other cemented carbide bodies comprise individual particles of a refractory material, such as a hard metal-carbide, bonded together by a more ductile matrix material comprising metal particles. A typical cemented carbide body is made up of tungsten carbide particles bound together by cobalt particles and finds extensive use as a material for making machine cutting tools, mining equipment and wear parts. Cemented carbide articles are most commonly formed by powder metallurgy techniques in which the blended powder, comprising an intimate mixture of a metal carbide and a metal, is compacted and sintered into a usable shape.

This invention addresses itself to a much improved method for making the intimately blended powders essential to the manufacture of such cemented carbide articles. Since the powders are mixtures of particles of a ceramic compound, such as, a metal carbide, and a metal, we refer to the blended mixture as a "cermet" powder.

A "cermet" can be generally defined as a blended powder containing a refractory phase, which is commonly a chemically inert high melting carbide, nitride, boride, silicide, oxide or mixtures thereof, intimately dispersed with a matrix phase which is commonly a metal. The matrix phase of the cermet occurs as a more or less topologically continuous phase intimately dispersed with the refractory phase and is available during the subsequent manufacture of the cermet into a tool to act to bind the structurally stronger refractory phase into a composite possessing desirable physical and chemical properties.

The name "cermet" is by no means limited to a single ceramic compound in conjunction with but a single pure elemental metal but should be understood to include a mixture of two or more ceramic compounds with an elemental metal, a single ceramic compound in conjunction with two or more elemental metals, and a mixture of two or more ceramic compounds with two or more elemental metals.

2. Description of the Prior Art a. Prior Methods of Making High Intensity Electric Arc Electrodes Application of the high intensity electric arc has been explored for a number of years in processes for reducing unrefined metal values in ore to a pure metal or to a metal compound from which the metal could more easily be recovered.

The high intensity electric arc process reduces these unrefined values to a more valuable refined state by high temperature chemical reactions which occur when the high intensity arc is maintained between a suitable cathode and an anode containing the unrefined values. During the process the anode is consumed.

Anode electrodes used in the high intensity electric arc process are fundamentally different from those used in other electric arc processes such as electric arc melting and refining, and in electric arc light sources. These differences are manifested by the high percentage of non-carbonaceous materials in high intensity electric arc electrodes (greater than 50 percent) and in the desirability for rapid anode burn-up. Generally, other electric arc electrodes attempt to minimize both non-carbonaceous materials in their composition and to minimize their burn-up rate.

Prior to this invention high intensity arc electrodes were made by either of two methods, both of which make use of a pitch type binder. In the older method, the carbon, the material containing the unrefined values and a pitch binder are mixed hot and extruded or molded into the electrode shape. Electrodes formed in this manner are in a "green" or unbaked state possessing little of their required strength or electrical conductivity. The green electrodes are carefully packed in a sand and coke mixture, slowly heated to temperatures near 1000° C. and allowed to furnace cool. This heating and cooling sequence requires from several days to several weeks depending on the size of the electrodes.

The electrode making technique was improved upon by the technique disclosed in U.S. Pat. No. 3,255,283 to Weidman. Weidmen's process is similar to the older method except that he uses a pitch binder that is rendered fluid at ambient temperatures by the addition of approximately 50 percent solvent. The fluid binder allows mixing of the constituents at room temperature and decreases the length of time required for the baking process, which is carried out in individual tubes.

Both of the processes discussed above suffer from the fact that electrodes made from pitch type binders remain soft until temperatures of about 450° C. are reached during the baking process. This condition necessitates careful handling of the electrodes prior to and during baking. In addition, the long bakeout times of the old process is obviously undesirable. The high solvent content of the "green" electrodes of the Weidman process is also a disadvantage because it can produce serious cracking, blistering and spalling as the solvent is released during the initial stages of baking, and there is always present the danger of fire and explosion as the volatile solvents escape. Moreover, the pitch type binders commonly used in both of the processes described above are inherently impure and typically contain significant concentrations of nitrogen and sulphur that can carry over into the refined product as undesirable impurities.

Prior to the present invention it was also known that a pre-polymerized furfuryl alcohol binder agent could be useful in making solid carbon electrodes such as are disclosed in U.S. Pat. Nos. 3,107,153; 3,198,714;

3,201,330 and 3,310,611, but, heretofore, pre-polymerized furfuryl alcohol has not been used as a binder agent in the production of high intensity electric arc electrodes generally, which are characterized by their high percentage of non-carbonaceous materials.

The present invention, therefore, through the use of pre-polymerized furfuryl alcohol resin, overcomes the above discussed shortcomings in fabricating electrodes generally for use in the high intensity electric arc processes and at the same time specifically provides electrodes for use in the high intensity arc to produce a cermet powder. The major advantage in using a pre-polymerized furfuryl alcohol is the decrease in curing time and temperature of the green electrodes.

b. Prior High Intensity Electric Arc Processes

It is disclosed in U.S. Pat. No. 2,616,843 that if an electrode containing 85 percent ore and 15 percent carbon is used as an anode in a high intensity electric arc operated in a halogen atmosphere that the anode containing the unrefined metal values can be vaporized in the arc process and the unrefined metal values can be reduced to a pure metal or to a metal chloride which will readily yield the pure metal. Such a process can be operated in a vacuum to reduce substances containing unrefined metal carbide values into pure metal and carbon.

Other variations are known. For example, U.S. Pat. No. 2,735,016 discloses a process which uses electric and magnetic fields to assist in the separation of the elements of the vaporized anode. In that process, the anode contained an unrefined metal carbide which was dissociated in the high intensity arc into its basic elements of a pure metal and carbon and then separated and collected in the form of a powder or fine crystals. Similarly if the ore contains unrefined metal oxides, an electrode can be made to include a stoichiometric quantity of carbon so that during vaporization and cooling in the high intensity arc all of the released oxygen combines with the carbon to form CO permitting the metal to be recovered in pure particulate powdered form. This latter process is disclosed in U.S. Pat. No. 2,979,449.

Where the composition of the ore is such that it contains the metal oxides of several different metals, called a "complex ore," U.S. Pat. No. 3,060,109 discloses a process of forming an electrode of the ore and carbon and using it as the anode in a high intensity arc operated in a carbon monoxide atmosphere to reduce the unrefined metal values to metal carbonyls which will readily yield the metal. Similarly, U.S. Pat. No. 3,099,614 discloses a "multiple oxide" (i.e., two different metal atoms linked to one oxygen atom) and carbon electrode used as an anode to yield separate metal oxides if a jet of oxygen gas is directed into the high intensity arc flame to fix the anode carbon and chill the separate metal oxide products below the temperature at which the multiple oxide will form. The individual metal oxides, collected in fine particle size, are each further treated to reduce them to pure metal.

U.S. Pat. No. 3,101,308 discloses still a further modification in which the electrode again contains a metal oxide and a measured quantity of carbon such that during the operation of the high intensity arc carbon monoxide gas is released to initiate and sustain the arc process. The arc process can then be operated at temperatures low enough to permit the unrefined metal to drip off the anode and be recovered as "round shot" of pure metal or metal carbide depending on the quantity of metal oxide and carbon contained in the electrode.

Further, the high intensity electric arc has been used to produce powders having particle sizes in the range of .005 microns to .2 microns. The powders disclosed include carbides. This process is disclosed in the book entitled "Ultra Fine Particles" by Kuhn, W.E., Editor-in-Chief, pages 129–145, 156–180 (1963).

However, in all of these high intensity electric arc processes, there is no disclosure that a blended cermet powder could be produced by the use of a high intensity electric arc.

c. Prior Methods of Making Cermet Powder

Prior to the present invention the process of making blended cermet powders of the type used to make cemented carbides consisted of some variation of the following "ball milling" method:

1. The concentrated refractory ore is refined to a pure oxide or chemical compound.
2. The oxide or chemical compound is then reduced to the pure refractory metal and ground into powder.
3. The refractory metal powder is heated to high temperature in the presence of carbon to cause the refractory metal carbide to form.
4. The refractory metal carbide is mixed with an appropriate amount of metal binder in powder form and the mixture comminuted by ball milling for several days to produce the blended cermet powder mixture in slurry form, typically having an individual particle size of 1 to 10 microns.
5. Finally, the slurry is dried to produce the cermet powder ready for use.

The disadvantages of the old ball milling method are obvious. It is time consuming, complex and uneconomical. Also, the powders produced by that method are coarse and are not completely homogeneous mixtures.

Not only does the present invention overcome these disadvantages, but also as a consequence, the quality of the cemented carbide bodies produced from the cermet powders of the present invention is considerably superior to the quality of such articles produced from the cermet powders of the old ball milling method.

SUMMARY OF THE INVENTION

In the present invention, the inventors have discovered that a blended homogeneous mass in powder form of ultra-finely divided refractory material, such as metal carbide, and matrix material, such as metal particles, of different metals is obtained out of a high intensity electric arc process by controlling the composition of the starting materials used to make up the anode used in the high intensity arc which is operated in a vacuum or other non-oxidizing atmosphere. The anode contains the material for forming the refractory material and the material for forming the matrix material, such as the metal oxides of two different metals, the first metal having a predetermined carbide forming strength and the second metal having less than the predetermined carbide forming strength, together with sufficient carbon to combine with the first metal to form a metal carbide, to combine with all the released oxygen to form carbon monoxide and to prevent back oxidation of the second metal. This process greatly simplifies the manufacture of cermet powders and produces a composition having unique properties beneficial in the production of cemented carbide bodies.

Further, in fabricating the electrodes themselves, the inventors have developed a process which uses a liquid pre-polymerized furfuryl alcohol resin binder that allows mixing the starting materials and extruding the electrode at room temperature and does not contain any solvent that must boil out of the shaped electrode during the baking step.

It is an object of this invention to produce a blended cermet powder comprising a homogeneous mixture or refractory material and matrix material by use of the high intensity electric arc process.

It is a further object of this invention to produce a cermet powder having the following characteristics:

The grains of the powder are ultra-fine in size averaging .01 to .1 microns. The powder is further characterized by the homogeneity of the intimately blended constituents. Together they form a mixture which has easy sinterability and allows sintering at lower temperatures with corresponding beneficial grain size refinement.

It is an object of this invention to produce a cermet powder having very high purities.

It is an object of this invention to provide a method of fabricating the electrodes used in the high intensity arc process which reduces the danger of fire and explosion caused by the escape of volatile solvents during the curing stage of the electrodes.

It is an object of this invention to provide a method of fabricating electrodes with a binder which allows the electrodes to obtain close to their full strength at ambient temperatures through the use of appropriate catalysts. Further, once the electrodes have hardened, the baking necessary to obtain proper electrical conductivity can be done quite rapidly.

DESCRIPTION OF THE PREFERRED EMBODIMENT

1. Starting Materials

In the present invention, it is first necessary to incorporate the unrefined values into an electrically conductive electrode suitable for use in a high intensity arc reactor. Preferably more than 50 percent by weight of the starting materials is the unrefined values.

By unrefined values we mean the proper proportions of those elements or compounds necessary to produce the proper elements upon vaporization of the anode during the high intensity arc process and formation of the characteristic plasma or tail flame of that process so that the end product produced out of the plasma is a cermet powder of the type herein defined.

The unrefined values can be present in the starting materials in a variety of forms or chemical compounds. The preferred starting materials are suitable quantities of carbon and the metal oxides of at least two different metals, at least one of which is a carbide forming material of a predetermined strength and another of which has a lesser predetermined strength to form a carbide relative to the first. The metal having the stronger carbide forming tendency will combine with the carbon during the electric arc process to form a very refractory metal carbide, and the metal having the lesser carbide forming tendency will be reduced to the pure metal during the electric arc process. The latter pure metal is the matrix material of the produced cermet.

For the purposes of our invention, a "non-carbide former" is defined as including not only a metal which has little or no carbide forming tendency as indicated below, but also, a metal which will not form a carbide in the high temperature restricted carbon environment of the high intensity electric arc while in the presence of another metal which has a stronger tendency to form a carbide in such an environment.

We have listed below certain metals (including materials which act like and are considered metals for the purposes of this invention). The groups themselves (but not necessarily the metals within each group) are arranged according to the predetermined relative strengths of the metals to form carbides.

| I<br>Strong Carbide Formers | II<br>Other Carbide Formers | III<br>Weak Carbide Formers | IV<br>Little Or No Carbide Forming Tendencies |
|---|---|---|---|
| Titanium | Iron | Nickel | Copper |
| Tantalum | Chromium | Cobalt | Silver |
| Tungsten | Manganese | Magnesium | Gold |
| Hafnium | Aluminum | | Platinum |
| Columbium | Beryllium | | |
| Zirconium | | | |
| Molybdenum | | | |
| Boron | | | |
| Silicon | | | |

To produce a cermet in accordance with this invention, we prefer to use as starting materials the unrefined metal oxides of at least one metal from Group I and at least one metal from either of Groups II, III or IV (although not all of Group IV metals form oxides). It is possible to use any of the Groups II, III or IV metals as the metal binder (matrix material) for Group I carbides even though a number of the former metals are actually "carbide formers." The reason for this is that the refractory metal carbides formed by the Group I metals, being more stable under the processing conditions than the other metals from Groups II, III or IV, scavenge all the available carbon thereby precluding any other carbide formation. Similarly Group III or IV metals could be used as binders for the Group II carbides.

For example, to produce a titanium carbide-nickel cermet powder a logical choice of unrefined values for starting materials to make the electrode would be rutile ($TiO_2$) (to provide the necessary titanium), nickel oxide (NiO) (to provide the nickel) and carbon. The nickel is the non-carbide former in this situation. The relative amounts of these materials are chosen such that the elemental composition of the plasma or tail flame of the high intensity arc favors the formation of titanium carbide and nickel.

To illustrate, we will write elementary equations representing the reactions that take place.

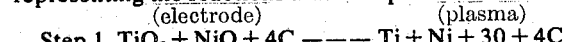
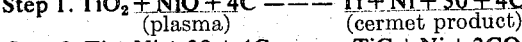

Step 1. $TiO_2 + NiO + 4C \longrightarrow Ti + Ni + 3O + 4C$
(electrode)         (plasma)
(plasma)            (cermet product)

Step 2. $Ti + Ni + 3O + 4C \longrightarrow TiC + Ni + 3CO$ or more concisely for the total reaction:

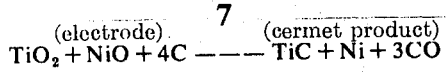

$$TiO_2 + NiO + 4C \longrightarrow TiC + Ni + 3CO$$

It can be seen that the stoichiometric quantity of carbon is important as a means of leeching the oxygen out of the plasma or tail flame by forming very stable molecules of carbon monoxide allowing the titanium (the stronger carbide former relative to nickel) to combine with the excess available carbon to form titanium carbide and preventing back oxidation of the nickel metal. Depending on the quantity of carbon present, a small amount of carbon dioxide may also form.

Each of the metals within a single one of the above groups could be further listed according to their relative strength in forming carbides, and, therefore, two different metals from a single group could be combined to produce a cermet. In this case, the weaker carbide forming metal would be refined to the pure metal state and serve as the matrix material while the stronger carbide forming metal would unite with the carbon to produce the refractory carbide phase. Depending on the metals and quantity of carbon selected one could form a cermet comprising a mixture of carbides of both metals as the refractory phase together with the pure metal phase of the weaker carbide forming metal.

Typical of the blended cermet powders we have been able to produce from our starting materials and by our method are the following:

1. titanium carbide-nickel
2. titanium carbide-iron
3. tungsten carbide-cobalt
4. zirconium carbide-nickel
5. tantalum carbide-cobalt
6. titanium carbide-nickel-molybdenum
7. boron carbide-copper
8. titanium carbide-zirconium carbide-nickel
9. titanium carbide-titanium oxide-nickel
10. titanium carbide-iron oxide-iron
11. titanium carbide-titanium oxide-titanium diboride-nickel Thus, by adjusting the electrode composition the process can be used to produce not only a mixed powder of a refractory carbide with metal binder but also to vary the relative content of metal binder and carbide over a wide range. We have found that the metal binder percentage of the total weight can be varied from 2 to 75 percent and expect that even greater variation is possible by further varying the electrode composition.

It is not necessary to use carbon and the metal oxides of the metals listed in Groups I, II, III or IV above as the starting materials. The metal oxides in their unrefined state, as in concentrated ore, are preferred because they are the least costly. However, the individual coarse powders of a refractory metal carbide (or a metal carbonate) and a pure metal binder could be used directly as starting materials. In the above example for making a titanium carbide-nickel cermet powder, the unrefined values incorporated into the electrically conductive high intensity arc electrode could be the individual powders of titanium carbide and nickel. In this case the process is essentially a process in which coarse particles of titanium-carbide and nickel are dissociated into elements in the arc process and then reunited to produce a refined blended cermet comprising homogeneous mixture of ultra-fine particles of titanium carbide and nickel.

Alternatively, as starting materials one could use simply carbon and the pure metals themselves. In the above example for making a titanium carbide-nickel cermet one could select carbon and the pure metals titanium and nickel for making the electrode to be used in the high intensity arc.

As previously indicated, not all cermets require a carbide as the refractory phase. Since boron, nitrogen and silicon react with metals similarly to carbon to form very refractory high melting borides, nitrides and silicides respectively, these materials may be substituted in our process for carbon to produce cermets having a boride, nitride or silicide as the refractory phase. The selection of metals is governed by the same principles as applies to carbon, i.e., for boron combine a strong boride forming material with a weaker boride forming material, the latter to be the non-boride forming matrix material of the cermet powder to be produced, etc.

Similarly by selection of a strong oxide forming material in combination with a weak oxide forming material as starting materials one can make a conductive high intensity arc electrode which in the arc process would produce a cermet comprising a very refractory metal oxide phase and a pure metal binder phase (i.e., $TiO_2 - Ag$).

By varying the electrode compositions, ambient atmosphere and arc parameters, one can synthesize a wide variety of cermet materials by the high intensity arc process.

2. Method of Electrode Fabrication

The electrode fabricating process as developed in this invention consists of first mixing the dry starting materials containing the unrefined metal values and carbon in a suitable mixer or blender to assure thorough distribution and commingling of the carbon and the unrefined values. A sufficient amount of liquid polymeric binder is then added to the dry mixture to coat each particle. The necessary amount of binder will vary between 10 and 30 percent by weight of the solids, the exact amount depending on the relative amounts of powders or ores of differing density and particle size and on the percentage by weight of filler carbon used. The resulting mass is then mixed in a heavy duty mixer such as a double bladed sigma mixer or a muller type mixer until it is a homogeneous mass. We have found two hours of mixing time sufficient to assure complete mixing of binder and powder. The viscosity of the polymeric binder can be chosen such that the viscosity of the resulting mix is proper for the next step which is the extrusion or molding of the mass into the electrode shape.

The binder of this invention is a pre-polymerized furfuryl alcohol resin that polymerizes rapidly when acidified. The rate of polymerization increases with the strength of the acid catalyst and the temperature of the catalyzed resin solution. We have found, however, it is possible to form strong electrodes using no catalysts by heating green electrodes to 250° C. for a period of two hours. The addition of 5 percent by weight (based on the total weight of the binder and catalyst together) of a weak organic acid catalyst, such as maleic acid or oxalic acid, lowers the polymerization temperature to 100° C. in two hours. The addition of up to 10 percent by weight of such a weak organic acid has been found satisfactory.

Stronger acids, such as the mineral acids including phosphoric acid, sulphuric acid and nitric acid, may also be used and these catalysts allow polymerization at room temperature. Boric acid may also be used as well as acid salts that decompose upon heating to form the acids. However, the weak organic acids are preferred.

The use of a pre-polymerized furfuryl alcohol resin offers a distinct advantage over the customarily employed binders such as pitch, corn syrup, etc. Since the polymerization of furfuryl alcohol proceeds rapidly at near room temperatures, particularly with the addition of acid catalysts, the green electrodes possess considerable strength even before the carburizing heat treatment. Furthermore, the strength of such electrodes increases continuously with heating whereas others which do not use a polymeric binder first soften with increasing temperature making them much less convenient to handle.

Once the binder in the green electrodes has polymerized, the electrodes have hardened and are strong and dimensionally stable and can be handled vigorously. They are then placed in an oven and baked at a temperature of about 900° C. to obtain the proper electrical conductivity. This heating step can be accomplished in several ways. In the presence of an air atmosphere it is necessary to pack the electrodes in coke to prevent oxidation. However, if an inert atmosphere is used the baking can be done in open trays. No special precautions are necessary to support the green electrodes although precautions should be taken to prevent temperature gradients.

The inventors have found that for 1 inch diameter electrodes a 1½ hour bake at 900° C. is adequate for good electrical properties. The baking temperature can be varied considerably around 900° C.

Due to the low volatile content and high strength of the polymerized electrodes we have found that they can be charged directly into a furnace preheated to 900° C. and air cooled following the carbonizing bake.

The inventors have manufactured cylindrical electrodes ranging from ½ inch to 2 inches in diameter and in lengths up to 3 feet. The only limitation on the size and shape of electrodes made by the inventor's process is the size of auxiliary equipment such as the mixers, furnaces, extruding or molding equipment. It is the intent of this application that the process applies to all conceivable sizes and shapes of electrodes.

EXAMPLE I

The percentage by weight of the initial constituents will vary depending on the particular kind of cermet powder desired as the end product. A typical formulation used in our laboratory to make electrodes for producing titanium carbide-nickel cermet powder is given below in percentages by weight:

|  | Percent | Parts |
|---|---|---|
| $TiO_2$ | 39.0% | |
| NiO | 18.5% | |
| Carbon | 16.5% | |
| Subtotal | 74.0% | 100 |
| Binder (varcum resin No. 8251) | 24.0% | 32.4 |
| Catalyst (maleic acid) | 2.0% | 2.7 |
| Total | 100.0% | 135.1 |

In practice some small variances from stoichiometric proportions are sometimes necessary due to the carbide forming efficiency in the plasma.

EXAMPLE II

We have used starting materials of the following proportions by weight to make satisfactory electrodes:

|  | Percent | Parts |
|---|---|---|
| unrefined values ($TiO_2$) | 61.8% | |
| carbon filler | 18.6% | |
| Subtotal | 80.4% | 100 |
| polymeric binder (varcum resin No. 8251) | 18.6% | 23.1 |
| acid catalyst (maleic acid) | 1.0% | 1.2 |
| Total | 100.0% | 124.3 |

The properties of the electrode made from the above starting materials in accordance with the process disclosed above are given below:

| electrode diameter | 1.0 | inches |
|---|---|---|
| electrode length | 24 | inches |
| compressive strength | 5290 | psi |
| Electrical resistivity | .05 | Ω-cm. |
| apparent density | 2.01 | grams/cc |

EXAMPLE III

Although the presence of a specified quantity of carbon filler, as described above, is essential to make electrodes for use in the high intensity arc process to make certain cermet powders as herein defined, the advantages of making electrodes through the use of a pre-polymerized furfuryl alcohol resin have broader application. We have found that the free carbon filler is not necessary to make strong electrically conducting electrodes as shown by the following example.

We have used as starting materials the following proportions by weight to make satisfactory electrodes:

|  | Percent | Parts |
|---|---|---|
| unrefined values ($WO_2$) | 79.5% | 100 |
| carbon filler | 0 | 0 |
| binder (varcum resin No. 8251) | 18.5% | 23.2 |
| acid catalyst (maleic acid) | 2.0% | 2.5 |
| Total | 100.0% | 125.7 |

The physical properties of the electrodes manufactured in the above example in which there is no carbon filler (the binder, of course, is primarily carbon) are given below:

| electrode diameter | 1.0 | inches |
|---|---|---|
| electrode length | 10.0 | inches |
| compressive strength | 3960 | psi |
| electrical resistivity | .1 | Ω-cm. |
| apparent density | 3.11 | grams/cc |

Hence, it is apparent that free carbon filler contents can vary over wide ranges in electrodes made by this process.

3. Method of Production of the Cermet Powders by the High Intensity Electric Arc The processed electrodes which are to be used to make the cermets are placed in the arc reactor as the anode and a high intensity electric arc is established between the anode and a graphite or tungsten cathode.

The high intensity electric arc necessary to vaporize a one-inch electrode requires about 40–60 volts and a current of 600–800 amps. We preferably begin the process in an inert atmosphere, such as argon, and maintain a positive flow of argon to insure that no extraneous source of oxygen is made available to the process. The process may also be run in a vacuum or other non-oxidizing atmosphere.

It is a characteristic of the high intensity electric arc that the anode of such an arc is consumed by evaporation due to the intense heat of the arc. The materials of the anode are projected into the brilliant, ultra-hot, tail flame which is characteristic of the high intensity electric arc. This flame is not a flame at all but, more accurately, a plasma jet which forms approximately as the perpendicular bisector of the imaginary obtuse angle formed at the intersection of the extensions of the longitudinal axis of both the anode and cathode. Chemical reactions can and do occur in this tail flame which are not readily realizable in ordinary arcs or by other methods of chemical synthesis. The evaporated materials from the anode dissociate into their elemental species in the plasma which can reach temperatures of over 8,000° K. The evaporated elements, which are at least in a partially ionized state, undergo a great many collisions with each other as they translate through or traverse the plasma. As the atoms and ions of the plasma reach the boundaries of the tail flame, they begin to cool rapidly, undergoing collisions with each other and with elements of the arc reactor atmosphere that penetrate the plasma boundaries. We have found that by controlling the chemical composition of the anode such that it contains the proper proportions of starting materials as specified above, and by controlling the reactor atmosphere, we have formed refractory carbides in one portion of the plasma followed by nucleation and growth of pure metal binder particles in a cooler portion of the tail flame. As the particles are subsequently ejected from the tail flame they are simultaneously homogeneously mixed and form a mass ready for collection. The homogeneous mass is an intimately blended powder. The powder can be collected from the walls of the chamber or it can be forced out of the chamber and into a separate collection apparatus.

It is possible to vary the average particle size of the powder mixture by varying the length of time the particles are permitted to stay in the plasma. The precise methods of controlling the average residence time of an ion or atom in the plasma are still under investigation. We know that the average residence time can be changed or varied by increasing or decreasing the size of the electrodes themselves. The reason for this is that the larger the electrode, the larger the plasma and the longer it takes the atoms to traverse the plasma. This condition results in more collision between atoms giving them more time for growth in size. Also, it is believed that particle size may be varied in other ways such as by gas quenching or magnetic pinching. The important point is that the arc process itself does not inherently restrict the produced powders to a single narrow range of particle sizes, but by building a variety of high intensity electric arc reactors it is possible to achieve a correspondingly large range in particle sizes. We have found typical particle sizes of .01 to .1 microns which indicates a rapid quenching of particles and which is an order of magnitude finer than similar powders made by the conventional ball milling processes.

Not only are the cermet powders produced by this process characterized by an ultra-fine particle size, but also they have other additional unique properties. They have easy sinterability, allowing lower sintering temperatures and corresponding grain size refinement. Moreover, the metal carbide and pure metal particles are intimately blended into a homogeneous mass. Lastly, very high purities of cermet powders are obtainable by this process.

Cermet powders having these characteristics are a great benefit in the production of cemented carbide articles. Since the ceramic (refractory) phase of a cermet powder is brittle, articles made from such powders are fabricated by means of powder metallurgy techniques. Such methods consist of compacting the cermet powder and then heating the compact, sometimes but not necessarily, under high confining pressures, to temperatures in the vicinity of the melting temperatures of the metallic phase. The physical and chemical properties of the article thereby fabricated reflect not only the initial degree of compaction and the nature of the subsequent heat treatment but, more importantly, are strongly dependent upon the physical characteristics of the starting powders themselves.

Although the optimal particle size for the manufacture of cutting tools and wear parts is not known, it is known, however, that small, i.e. submicron, powders produce stronger, longer lived articles than do powders composed of larger particles. Theories of dispersion hardening all indicate that the smaller the size of the dispersoid phase the better are the strength properties and the cermet powders of the present invention definitely fall within the scope of such theories. Therefore, the smaller the average diameter of the individual particles and the greater the degree of homogeneity of the two major phases, then the better the quality of the cemented carbide body. Our cermet powders, since they are particularly characterized by their ultra-fine size and the homogeniety and purity of the mixture, make possible the production of especially high quality cemented carbide articles.

What is claimed is:

1. A composition of matter comprising an intimately blended powder of finely divided particles of both a refractory material and a metal matrix material, the average particle size of the finely divided particles of both the refractory material and the metal matrix material being in the approximate range of 0.01 to 0.1 microns.

2. The composition of claim 1 wherein the refractory material comprises metal carbide particles and the matrix material comprises metal particles.

3. The composition of claim 2 wherein the weight of the metal particles as a percentage of the total weight is in the approximate range of 2 to 75%.

4. The composition of claim 2 wherein the metal carbide is titanium carbide and the matrix metal is nickel.

5. The composition of claim 2 wherein the metal carbide is tungsten carbide and the matrix metal is cobalt.

6. The composition of claim 1 wherein the refractory material is at least one material selected from the group consisting of a carbide, nitride, boride, silicide and oxide and the matrix material is a metal.

* * * * *